April 16, 1940. C. A. BERGMANN 2,197,120

FILTER

Filed March 21, 1938 2 Sheets-Sheet 1

INVENTOR.
Carl A. Bergmann
BY
ATTORNEYS.

April 16, 1940.  C. A. BERGMANN  2,197,120
FILTER
Filed March 21, 1938  2 Sheets-Sheet 2
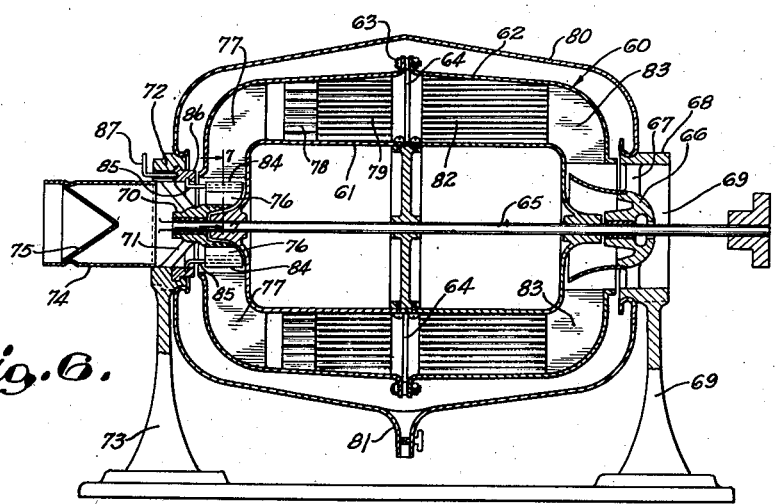
INVENTOR.
Carl A. Bergmann
BY
ATTORNEY.

Patented Apr. 16, 1940

2,197,120

UNITED STATES PATENT OFFICE 2,197,120

FILTER

Carl A. Bergmann, Milwaukee, Wis., assignor to Walter D. Mann, Milwaukee, Wis.

Application March 21, 1938, Serial No. 197,118

6 Claims. (Cl. 183—77)

This invention relates to improvements in filters and more particularly to air or gas filters.

Present-day filters have only partial efficiency and are therefore not capable of completely removing objectionable foreign matter from air or gas. The present invention is designed to provide a filter of such increased efficiency that it may be successfully employed to remove pollen or other fine particles from the air for the benefit of hay fever sufferers or others having an allergic reaction to certain material in the air; to remove smoke, vapors or oil mist from the air; and to clean smoke and exhaust gases and remove dust from the air in industrial plants.

It is a general object of the present invention to provide an improved filter wherein centrifugal or inertia force is utilized to aid in the removal of foreign matter from air or gas.

A more specific object of the invention is to provide a filter having a rotor, means rotatable with said rotor forming a plurality of elongated passageways of relatively small radial width and preferably but not necessarily extending transversely of the plane of rotation of the rotor, and means for propelling air to be cleaned through said passageways while the rotor is rotated, said air being subjected to the action of centrifugal force whereby particles of foreign matter in the air are deposited by centrifugal force on the walls of said passageways.

A further object of the invention is to provide a device as above described wherein the elongated passageways or filtering elements may be formed of corrugated board.

A further object of the invention is to provide a device of the class described having an intake positioned exteriorly of an enclosure, means for drawing in air through said intake, means for conditioning said air, and means for admitting a regulated amount of air from within the enclosure to mix with said outside air.

A further object of the invention is to provide a filter as above described including a rotor having an opening positioned to release moisture or other foreign matter which is thrown centrifugally during the passage of the air through the rotor, certain forms of the invention also including means for adjustably varying the size of said release opening.

A further object of the invention is to provide a device as above described having means for imparting vibrations to the rotor as the latter rotates to dislodge foreign matter in the elongated passageways and cause the same to travel toward release openings in the rotor.

A still further object of the invention is to provide a filter, including means for drawing in air to the filter, and means for adjustably varying the volume of air admitted.

With the above and other objects in view, the invention consists of the improved filter and all its parts and combinations as set forth in the claims and all equivalents thereof.

In the accompanying drawings in which the same reference numerals designate the same parts in all of the views:

Fig. 6 is a longitudinal vertical sectional view through another form of the device, particularly adapted for removal of smoke, vapor, oil mist, and other similar foreign matter from the air;

Fig. 7 is an enlarged fragmentary sectional view taken on line 7—7 of Fig. 6;

Fig. 8 is a vertical sectional view through an industrial type of centrifugal air cleaner particularly suitable for the cleaning of smoke and exhaust gases and for the collection of dust;

Fig. 9 is a cross sectional view of the rotor taken on line 9—9 of Fig. 8; and

Fig. 10 is a fragmentary sectional view taken on line 10—10 of Fig. 8 and showing a slight modification.

Figure 1:
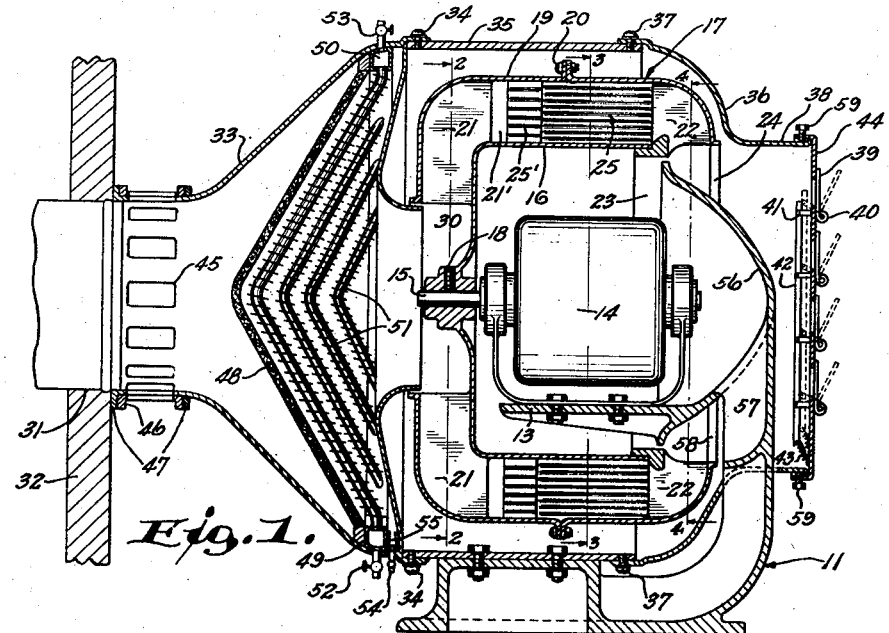
Fig. 1 is a longitudinal vertical sectional view through one form of the improved device.

Referring more particularly to Figs. 1 to 5 inclusive, the numeral 11 indicates a frame structure having a base portion 12 and having an elevated platform portion 13 for supporting an electric motor 14. The motor 14 has a drive shaft 15 to which the inner drum 16 of a rotor 17 is secured by a set screw or the like 18. The peripheral wall portion of the drum 16 projects inwardly to surround the motor 14 and is rotatable there-around.

Figure 2:
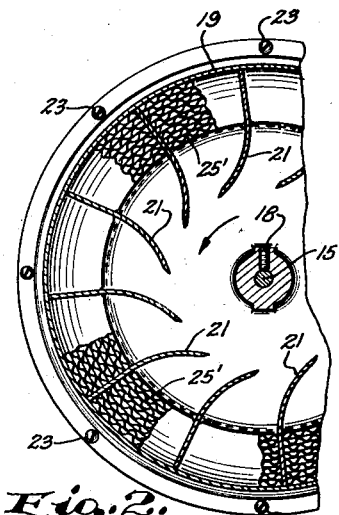
Fig. 2 is a fragmentary sectional view taken on line 2—2 of Fig. 1.
Figure 3:
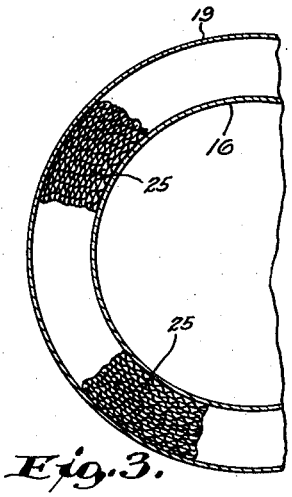
Fig. 3 is a fragmentary sectional view of the rotor taken on line 3—3 of Fig. 1.
Figure 4:
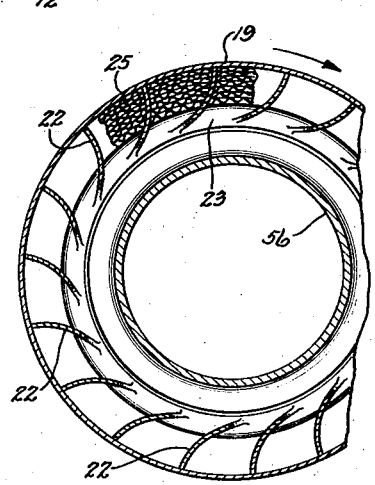
Fig. 4 is a fragmentary sectional view taken on line 4—4 of Fig. 1.

The rotor 17 comprises said inner drum 16 and an outer drum 19 which is spaced from the inner drum and which is preferably formed of two complementary sections bolted together as at 20. Intake vanes 21 (see Fig. 2) join the inner drum 16 with the outer drum 19 as illustrated, and said vanes have curved inner end portions as shown in Fig. 2 to accelerate the air columns and draw air in through the open end of the outer drum 19 and direct the same transversely through the rotor between spaced drums 16 and 19. Discharge vanes 22 connect the inner drum 16 with the outer drum 19 at the outer end of the rotor, and these discharge vanes may be integral with a ring 23, which ring is secured to the drum 16 as shown in Fig. 1. The discharge vanes are curved backwardly as shown in Fig. 4 in order to reduce the discharge speed of the air leaving the rotor through the discharge opening 24 and thus reduce the consumption of power. The edges of the vanes 22 are at a greater distance from the center of the rotor than the edges of the vanes 21 to insure enough suction and pressure to overcome the resistance of the air traveling transversely through the rotor.

Extending around the periphery of the inner drum 16 between the intake vanes 21 and the discharge vanes 22 and substantially filling the space between the inner and outer drums is a circular filter element designated generally by the numeral 25. The filtering element is preferably formed of superimposed layers of corrugated board to form a plurality of elongated passageways 26 of relatively small cross section extending transversely of the plane of rotation of the rotor. Other material than corrugated board may of course be employed for forming the passageways, but corrugated board is inexpensive and can therefore be readily replaced when necessary.

Figure 5:
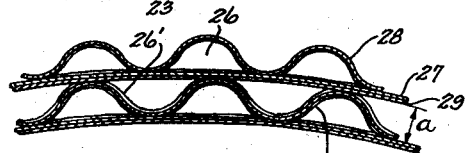
Fig. 5 is an enlarged fragmentary cross sectional view of the filtering element.

Referring to Fig. 5 showing a detailed view of the corrugated board filter construction, each layer may comprise a fibrous backing sheet 27 to which a corrugated element 28 is adhesively secured. The several layers may be separated from each other by extra layers 29 of cloth or paper material to strengthen the filtering element.

In order to form a passageway for air to be admitted into the inlet opening 30, of the rotor, a conduit 31 may be utilized which extends exteriorly of a building wall 32. Inside of the wall 32 the conduit may connect with a conical end cover 33, said end cover being secured as at 34 to a peripheral housing 35 for the rotor. A cover 36 for the other end of the rotor may be connected as at 37 to the peripheral housing portion 35. The end cover 36 may be formed with an extension 38 through which filtered air may be discharged. In order to control the discharge, a plurality of louvers 39, which are pivoted as at 40, may be utilized. The louvers may have inner extensions 41 which are pivotally connected to a common bar 42, and yielding means 43 may be associated with the bar to normally maintain the louvers in closed position. The yielding means is of such strength that the louvers will automatically open to the dotted line position of Fig. 1 in response to air pressure. The louver assembly is mounted on an end cover 44 for the extension 38. In order to provide for the admission of inside air to mix with the outside air, a plurality of openings 45 may be formed in the outer end of the housing portion 33. A sleeve 46 which is provided with similar openings to the openings 45 is rotatable between flanges 47 to regulate the amount of air which may be admitted through the openings 45.

In order to preliminarily filter the admitted air before said air is admitted to the rotor, any ordinary type of air filter 48 may be positioned within the end housing portion 33.

A unit heater or cooler may also be positioned inwardly of the preliminary filter 48, and said heater or cooler may comprise a lower header 49, an upper header 50, and finned connecting tubes 51. Taps 52 and 53 may be associated with the headers 49 and 50 respectively, and an additional tap 54 is connected with a drain pan 55 for removing accumulated condensate, which may form when cooling is being accomplished.

The motor supporting frame 11 has a portion 56 which fits within the open outer end of the inner drum 16 and around which said drum rotates. A hollow passageway 57 leads to the motor chamber and communicates at 58 with the rotor whereby some of the air from the rotor discharge vanes is blown into the motor chamber to cool the motor.

In operation air drawn in from the exterior through the inlet conduit 31 may be mixed with a predetermined amount of inside air admitted through the openings 45. The air then passes through the preliminary filter 48 and past the pipes 51 where it is either heated or cooled, as desired. The filtering element 48 which is of ordinary structure will remove a majority of foreign matter from the air. It will, however, pass four to ten per cent dust particles or the like, because these commercial filters are not one hundred per cent efficient. The intake vanes 21, which are designed for impact free passing of the air, direct the air transversely to the plane of rotation of the rotor while the latter is rotating. While passing the vanes 21, the air is accelerated up to the maximum peripheral velocity, and the particles of dust and other foreign matter are evenly distributed in the air in the space 21' before said particles enter the filtering element 25. It is preferred that the filtering element have an inner portion 25' provided with passageways of larger cross sectional area than the area of the passageways in the main portion of the filter. In addition the walls of the passageways are preferably coated with an oil or vaseline 26'. The vanes 21 may also be coated with similar material to trap foreign matter thrown against said vanes by acceleration forces, whereby the inertia of said particles is utilized to cause said entrapment.

As the air travels through the passageways 26, the particles of dust and other foreign matter in the air are subjected to the action of centrifugal force which causes the same to travel in a radially outward direction, whereby said dust particles are thrown against the walls of the corrugations and trapped by the coating thereon. The degree of air cleaning can be varied by varying the distance a, Fig. 5, by controlling the magnitude of the centrifugal force, and by controlling the time period during which said centrifugal force acts upon the air columns in the filter. As the air leaves the filtering element, it is propelled by the discharge vanes through the end opening 24 of the rotor and out past the louvers 39.

The end member 44 carrying the louvers is removably held in position by set screws or the like 59, and by loosening said set screws the end member 44 may be rotated to bring the louvers into any desired air directing position. Referring now more particularly to Figs. 6 and 7, there is illustrated a form of invention which is particularly suitable for removing smoke and other extremely fine particles from air or gas. The rotor 60 of this form of the invention comprises an inner drum 61, and an outer drum 62 formed of two complemental sections which are bolted together as at 63 in such a manner as to provide a peripheral opening 64. The walls of the outer drum 62 converge slightly toward said opening 64. The inner drum 61 is mounted on a shaft 65, and one end of said shaft is journaled in a bearing 66 and extends outwardly beyond said bearing for connection with a source of power. The bearing 66 is supported by webbing 67 within a ring 68 carried by the upper end of a standard 69. The ring 68 forms the discharge opening 69 for the device.

The other end of the rotor shaft 65 is journaled in a bearing 70, and said bearing is supported by spiders 71 within a ring 72, the ring 72 being mounted on the upper end of a standard 73.

Air admitted through an inlet conduit 74 passes a preliminary filtering element 75 and then enters through the ring 72 around the bearing 70 to the open end of the drum. Guide vanes 76 direct said air, in a manner to be hereinafter described, to the rotatable intake vanes 77. These vanes 77 are identical in construction to the vanes 21 of the form of invention shown in Fig. 1. The air is then directed through a filtering element 78 having passageways of relatively large cross section and through a filtering element 79 having passageways of small cross section. The filtering elements 78, 79 and 82 may be identical in construction to the filtering elements 25' and 25 of the principal form of the invention. As the air passes through the filtering elements 78, 79 and 82, any oil mist in the air or any nicotine or other products from smoke are deposited by centrifugal force on the walls of the corrugations forming the passageways. This material then creeps along said walls and is thrown by centrifugal force toward the opening 64 in the outer drum 62. The material released through the opening 64 will fall upon the inner wall of the outer housing 80 and may be removed through a drain cock 81.

The cleaned air is then discharged through the opening 69 by the discharge vanes 83, which discharge vanes are similar in construction to the discharge vanes 22 of the principal form of the invention.

The guide vanes 76 have their inner edges secured to the periphery of the bearing 70 as shown in Figs. 6 and 7, and the outer edges of the vanes are looped as at 84. Pins 85 extending through said loops have their outer ends angled and connected to a rotatable member 86. The member 86 may be rotated by manipulation of a lever 87 to flex the guide vanes to one of the dotted line positions shown in Fig. 7. Thus the vanes may be deflected either against or with the direction of rotation of the rotor to control the volume of air admitted to the rotor.

The rotor of this form of the invention is supported by two bearings so that a higher rotor speed is permitted. In addition the rotor drums are relatively long so that air columns are subjected to the action of centrifugal force for a relatively long period of time. Thus a high cleaning efficiency is obtained.

The filtering elements 78, 79 and 82 are preferably of corrugated board so that the latter may be discarded when they are filled with deposits. Any other suitable material may, however, be employed for forming the elongated passageways.

In cases where gas or air under high pressure is to be cleaned, the inlet and outlet openings of the filter may be modified for convenient connection to pipe lines or the like. The housing and rotor drums must also be formed with heavy enough walls to withstand the increased pressures. In cases where pressures are high, but in which it is desired to keep the pressure low between the housing 80 and the outer drum 72 in order to reduce power consumption, then suitable stuffing boxes must be employed between the rotor and the stationary parts.

Figures 8, 9 and 10 illustrate a design which is particularly suitable for industrial purpose, such as dust collecting, smoke cleaning, and the ventilating of large buildings. It may be also employed to humidify and cool air. The device includes a rotor 88 formed of two parts 89, 90. The rotor is mounted on a shaft 92 driven by an electric motor 93, and the drive shaft may be journaled in bearings 94. Spaced from the rotor 88 is an outer rotor portion formed of two parts 95 and 96, which parts are rotatable with the inner rotor parts 89 and 90 respectively. A lower housing portion 97 surrounds the lower rotor parts and forms a dust or liquid collecting receptacle. An upper housing part 98 is spaced from and connected to an inner air directing member 91, and the housing 98 has its upper end formed with a discharge opening 99.

The air or gas to be cleaned flows into the duct 100 and is drawn in by the rotor and is acted on by the vanes 101 which function in a manner similar to the vanes 21 of the form of invention shown in Fig. 1. The air then passes through the plurality of elongated compartments 102 of the filtering element 103. This filtering element is preferably formed of metal and in cross section has the appearance shown in Fig. 9. It is preferred to keep the distance between the concentric walls forming the filtering element as small as possible to obtain high efficiency of operation. The particles of foreign matter are thrown by centrifugal force against the concentric walls of the filtering element and creep along these walls until they reach the outer chamber 104. The foreign matter is also thrown by acceleration force against the cross partitions 102' whereby the inertia of said particles is used to collect the same. The rotor portions 90 and 96 are adjustable to provide an annular opening at 105, and said adjustable position is indicated by dotted lines in Fig. 8. This adjustment is permitted by movement of the member 106 along the key-way 107, which movement may be brought about by rotating a shaft 118 to operate a clutch fork 119. With the lower and upper rotor portions separated to a desired degree, as indicated by dotted lines at 105, the foreign matter will be thrown by centrifugal force exteriorly of the rotor and into the receptacle 97. The air may then pass through another filtering element 108 and be discharged through the discharge opening 99.

A suspended hammer 109 may be utilized to impart vibrations to the rotor to facilitate movement of the fine particles along the walls of the filtering elements and to prevent clogging of the small passageways of the filters. These vibrations may also be imparted by an electromagnet 110 which is incited by electrical impulses to impart vibrations of high frequency to metal of the rotor and to the small air columns moving through the filtering elements to augment the movement of foreign matter in said air.

One or more nozzles 112 may be utilized to spray a stream of liquid, such as water, onto the surface of the filters to help imprison the particles and to keep the compartments clean by the continued rinsing action of the spray. Where a spray is employed, the flanges at the opening 105 of the outer rotor portion are provided with backwardly curved ribs 113 so as to always maintain spaces 114 through which the liquid may be discharged to the collecting receptacle 97 (see Fig. 10).

The deposits in the collecting receptacle 97 will settle at the bottom thereof and may be removed through the drain opening 115. Liquid to the nozzles 112 may be supplied through an inlet line 116.

The cleaned air or gas is discharged through the opening 99 and into a suitable outlet duct connected to the flange 117 surrounding the opening 99. This discharge is augmented by backwardly curved discharge vanes 101' which function in the same manner as the discharge vanes 22 of the principal form of the invention.

The spray of liquid discharged by the nozzle 112 may perform a cooling and dehumidifying function if cold water is utilized, or a heating and humidifying function if hot water is employed.

It is apparent that in all forms of the invention the air to be cleaned is subjected to the action of centrifugal force and to the action of inertia such as acceleration and deceleration while traveling through a plurality of elongated passageways of restricted radial width, the foreign matter in the air being either trapped on the walls of the filter by a sticky coating, or said foreign matter and moisture being directed by the centrifugal force through release openings of the rotor into a collecting receptacle.

The construction is highly efficient and can be employed for any of the purposes mentioned and for a variety of other purposes. In addition it may embody heating or cooling features as described.

In the claims where the term "air" is employed, it must be understood that this contemplates any other gas.

Although only a few forms of the invention have been shown and described, it is obvious that various changes and modifications may be made without departing from the spirit of the invention, and all of such changes are contemplated as may come within the scope of the claims.

What I claim is:

1. An air filter comprising a rotor, a plurality of superimposed annular layers of corrugated board mounted on said rotor and rotatable therewith to form passageways of relatively small radial width, and means for moving air to be cleaned through said passageways, said air being subjected to the action of centrifugal force whereby particles of foreign matter in the air are deposited by centrifugal force on the walls of said passageways.

2. An air filter comprising a rotor, means rotatable with said rotor forming a plurality of narrow elongated passageways, and means for moving air to be cleaned through said passageways, said air being subjected to the action of centrifugal force whereby particles of foreign matter in the air are deposited by centrifugal force on the walls of said passageways, and there being passageways communicating with said first passageways and with the outlet end of the rotor which are of less cross sectional area than said first passageways.

3. An air filter comprising a rotor having an annular filter space, and means for moving air to be cleaned from one end of the rotor to the other through said filter space, said space being formed with a multitude of elongated passageways of small cross-section which substantially fill said space in honeycomb fashion and all of which extend transversely of the plane of rotation of the rotor, the radial dimension of said space being many times greater than the cross-sectional dimension of one of said passageways whereby there are many radially adjacent passageways, each of said passageways serving to individually confine a column of air of small cross-section and to cause each of said columns to move in a substantially straight line from one end of the filter space to the other, said air being subjected to the action of centrifugal force whereby particles of foreign matter in the air are deposited by centrifugal force on the walls of each passageway.

4. An air filter comprising a rotor having an annular filter space, and means for moving air to be cleaned from one end of the rotor to the other through said filter space, said space being filled with a plurality of radially spaced annular partitions and the annular space of each adjacent pair of partitions being divided to form a multitude of elongated passageways of small cross-section which extend transversely of the plane of rotation of the rotor, each of said passageways serving to individually confine a column of air of small cross-section and to cause each of said columns to move in a substantially straight line from one end of the filter space to the other, said air being subjected to the action of centrifugal force whereby particles of foreign matter in the air are deposited by centrifugal force on the walls of each passageway.

5. An air filter comprising a rotor having an annular filter space, and means for moving air to be cleaned from one end of the rotor to the other through said filter space, said space being filled with a removable filtering element including a plurality of radially spaced annular partitions and the annular space of each adjacent pair of partitions being divided to form a multitude of elongated passageways of small cross-section which extend transversely of the plane of rotation of the rotor, each of said passageways serving to individually confine a column of air of small cross-section and to cause each of said columns to move in a substantially straight line from one end of the filter space to the other, said air being subjected to the action of centrifugal force whereby particles of foreign matter in the air are deposited by centrifugal force on the walls of each passageway.

6. An air filter comprising a rotor having an annular filter space, and means for moving air to be cleaned from one end of the rotor to the other through said filter space, said space being filled with superimposed layers of corrugated board to form a multitude of elongated passageways of small cross-section which extend transversely of the plane of rotation of the rotor, each of said passageways serving to individually confine a column of air of small cross-section and to cause each of said columns to move in a substantially straight line from one end of the filter space to the other, said air being subjected to the action of centrifugal force whereby particles of foreign matter in the air are deposited by centrifugal force on the walls of each passageway.

CARL A. BERGMANN.